(12) United States Patent
Jackson et al.

(10) Patent No.: US 7,823,919 B2
(45) Date of Patent: Nov. 2, 2010

(54) FILTER FOR AIRBAG INFLATOR USING VARIABLE EXPANDED METAL

(75) Inventors: Scott Jackson, Centerville, UT (US); Robert E. Lewis, West Haven, UT (US); Kevin Smith, Bountiful, UT (US); Gary Smith, Layton, UT (US); Gregory J. Lang, South Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 178 days.

(21) Appl. No.: 12/154,750

(22) Filed: May 27, 2008

(65) Prior Publication Data

US 2009/0295132 A1    Dec. 3, 2009

(51) Int. Cl.
*B60R 21/26*    (2006.01)
(52) U.S. Cl. ...................................... 280/736
(58) Field of Classification Search ............ 280/736, 280/740, 741, 742
See application file for complete search history.

(56) References Cited

U.S. PATENT DOCUMENTS

| | | |
|---|---|---|
| 5,100,171 A | 3/1992 | Faigle et al. |
| 5,230,726 A * | 7/1993 | Smith et al. ............ 55/487 |
| 5,308,370 A | 5/1994 | Kraft et al. |
| 5,407,120 A | 4/1995 | Philpot |
| 5,500,271 A | 3/1996 | Pasch et al. |
| 5,551,724 A | 9/1996 | Armstrong, III et al. |
| 5,763,820 A | 6/1998 | Philpot et al. |
| 5,829,785 A | 11/1998 | Jordan et al. |
| 6,065,774 A | 5/2000 | Cabrera |
| 6,123,359 A | 9/2000 | Cabrera et al. |
| 7,267,365 B2 | 9/2007 | Quioc |
| 7,503,354 B2 * | 3/2009 | Amano ................. 141/59 |
| 2003/0222443 A1* | 12/2003 | Cheal et al. .......... 280/741 |
| 2005/0161925 A1* | 7/2005 | Blackburn .......... 280/741 |
| 2007/0062168 A1 | 3/2007 | Adamini et al. |
| 2009/0261562 A1* | 10/2009 | Clark et al. .......... 280/741 |

FOREIGN PATENT DOCUMENTS

| | | |
|---|---|---|
| JP | 05285578 A * | 11/1993 |
| WO | WO-96/30105 | 10/1996 |
| WO | WO-03/057347 A1 | 7/2003 |

\* cited by examiner

*Primary Examiner*—Faye M. Fleming
(74) *Attorney, Agent, or Firm*—Sally J Brown; Madson IP, P.C.

(57) ABSTRACT

An airbag inflator that includes a pyrotechnic material capable of producing a quantity of gas during deployment. The inflator also includes a filter. The filter may be an expanded metal filter that is wrapped about the pyrotechnic material. When this filter is wrapped about the pyrotechnic material, the filter forms a plurality of layers having holes that are a different size. This filter also includes a first set of barriers and a second set of barriers that are positioned exterior of the first set of barriers, the second set of barriers being offset from the first set of barriers. Gas passing through the filter will encounter the first set of barriers, be re-directed, encounter the second set of barriers, be re-directed, and then flow out of the filter.

22 Claims, 3 Drawing Sheets

FILTER FOR AIRBAG INFLATOR USING VARIABLE EXPANDED METAL

BACKGROUND OF THE INVENTION

Airbag and airbag systems have been known for many years. These systems are designed to inflate an airbag into a vehicle interior during a crash. The airbag is designed such that the occupant will contact the airbag rather the steering wheel, the dashboard, the vehicle side, and/or other portions of the vehicle. Airbags have been credited with saving many lives and are now standard on all new motor vehicles in the United States, Europe, and other parts of the world.

In order to deploy the airbag during a crash, an inflator is often used. The inflator is a device that is capable of producing and/or channeling a quantity of inflation gas into the airbag during the crash. This influx of gas into the airbag operates to deploy the airbag and position the inflated airbag within the vehicle interior. One type of inflator known in the art is the "pyrotechnic" inflator. This type of inflator includes a gas generant or other pyrotechnic material that is ignited during the crash. When ignited, the gas generant will produce a quantity of gas that may then be channeled into the airbag.

The ignition of the gas generant can produce particulates and other solid particles which should be filtered out of the gas prior to having the gas enter the airbag. Accordingly, a filter is often added to a pyrotechnic inflator that operates to filter the gas in this manner. However, many known filters are often expensive and greatly increase the costs associated with producing the inflator. Accordingly, a new type of filter should be designed that is inexpensive, yet still effective in filtering the gas.

BRIEF SUMMARY OF THE INVENTION

An inflator is disclosed. The inflator comprises a pyrotechnic material capable of producing a quantity of gas during deployment. The inflator also comprises an expanded metal filter wrapped about the pyrotechnic material, wherein when the filter is wrapped about the pyrotechnic material, the filter forms a plurality of layers and each layer has holes that are a different size. In some embodiments, the filter is a single sheet of material. In other embodiments, the flow of the gas through different size holes ensures that the gas flow is not constant and operates to filter and cool the gas. The holes of different sizes may be produced by piercing the metal filter to form holes of consistent size. Once, the slit is formed, the slit is "pulled," "stretched" or "expanded" so that the slit is sized to the appropriate and desired size. The size of the initial piercing as well as the degree to which the material is stretched determines the final size of the opening. The filter may also be tuned such that it does not affect the internal combustion pressure of the inflator.

In other embodiments, the filter may further comprise a first set of barriers and a second set of barriers. (Such barriers could be added to wire mesh filters or standard filters known in the industry). The second set of barriers are positioned exterior of the first set of barriers, the second set of barriers being offset from the first set of barriers. Gas passing through the filter may contact the first set of barriers, be re-directed, contact the second set of barriers, be re-directed, and then flow out of the filter. In other embodiments, the redirection of the gas by the first set of barriers causes particulates to collect on the first set of barriers and the redirection of the gas by the second set of barriers causes particulates to collect on the second set of barriers. The first and second set of barriers may be areas of an expanded metal filter that were not pierced. The flow of the gas through different size holes may ensure that the gas flow is not constant and operates to filter and cool the gas. Further embodiments are designed in which the holes of different sizes are produced by piercing the metal filter to form holes of consistent size and then expanding the holes into a slit having the desired size.

The present embodiments relate to a filter that may be used as part of a pyrotechnic airbag inflator. The filter is designed to filter out solid particulates, residues, etc. out of the flow of gas. The filter may also operate to cool the gas prior to the gas entering the airbag. In order to properly filter the gas, the filter may be permeable to gas but impermeable to solids. In some embodiments, this may be accomplished by having openings (or holes) in the filter that are sufficiently small such that gas may flow through the opening, but solid materials cannot.

The filter is generally made of a single strip of material. However, this strip of material may be wrapped in a circle such that the gas generant is positioned interior of the filter. Such wrapping of the filter may cause the filter to form a variety of different layers. The gas escaping from the inflator must pass through all of the layers of the filter prior to escaping the filter.

The filter may be a "variable expanded filter" which means that one or more of the openings will have different sizes (or diameters). In some embodiments, the different-sized openings may be positioned such that these openings will be on different "layers" when the filter is wrapped about the gas generant. Likewise, adjacent openings, or openings that are proximate on the filter may have different sizes and profiles, as desired. Any location for the different-sized openings may be used.

It should be noted that the use of different sizes of openings in a single strip of filter material may be beneficial. For example, by varying the size of the openings, the flow of the gas through the filter may be fine tuned, regulated, changed, or adjusted, as desired. Likewise, by varying the size of the openings throughout the filter, a non-uniform filter may be achieved, thus meaning that the flow of gas through one portion/section of the filter may differ from the flow of gas through another section of the filter. Such less constant and/or non-uniform flow may be desirable in that it may provide more effective filtering of the particulates out of the gas. Further, this non-uniform, less constant gas flow may operate to provide further cooling of the gas prior to the gas exiting the filter and entering the airbag.

The first and second sets of barriers may be found at different layers of the wrapped filter. Specifically, the second set of barriers are positioned exterior of the first set of filters. Thus, the gas flowing out of the filter will flow through the layer housing the first set of filters prior to accessing the layer with the second set of filters. The second set of barriers may be offset from the first set of barriers. It should also be noted that such barriers may likewise be added to wire mesh filters in the manner described herein.

The filter is positioned such that it circumscribes the pyrotechnic material (which is sometimes called the gas generant). Accordingly, when the pyrotechnic material is ignited and converted into a quantity of inflation gas, this gas must pass through the filter prior to exiting the inflator. When passing through the filter, the gas may contact the first set of barriers and/or the second set of barriers. When the gas contacts a barrier in the first set of barriers and/or the second set of barriers, the gas will be forced to turn or deflect in order to pass through the filter. Thus, gas exiting the inflator must take a tortuous or twisting path. In other words, the gas flow is not "constant," as the gas is required to deflect and turn as it exits the filter. As the gases are turned, particulate matter, residue, solid particles, and/or other undesirable material collect on the barrier(s) and are removed from the gas flow.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the present invention, as represented in the Figures, is not intended to limit the scope of the invention, as claimed, but is merely representative of embodiments of the invention.

Figure 1:
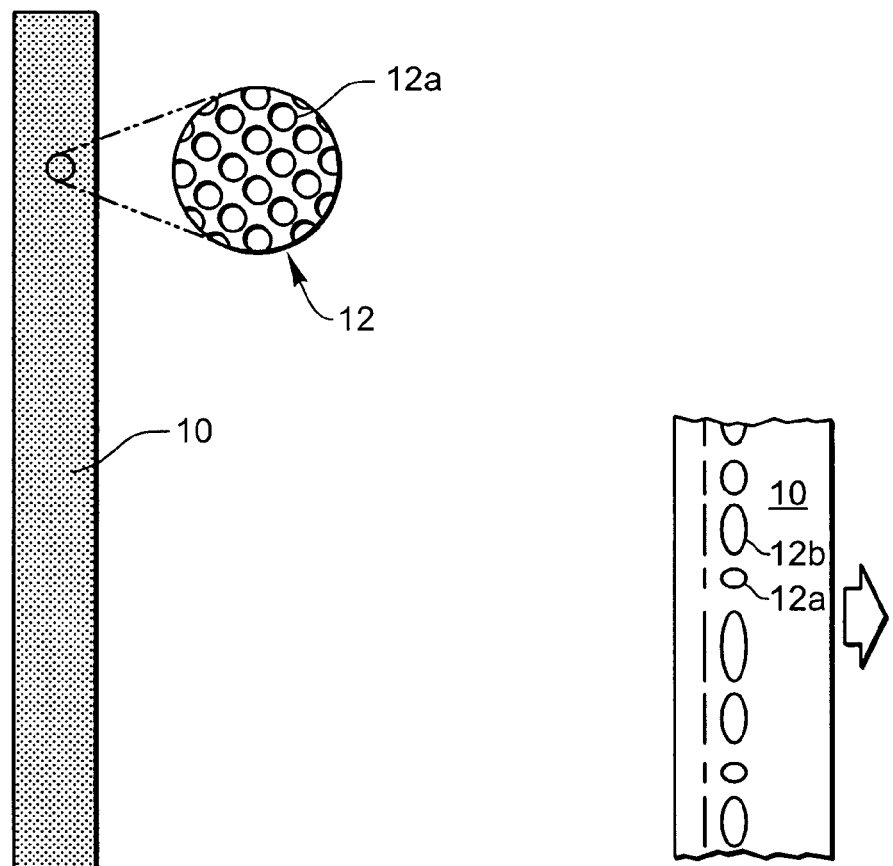
FIG. 1 is a layout plan view of a filter with enlarged regions according to the present embodiments.

Referring now to FIG. 1, a layout plan view of a filter 10 according to the present embodiments. The filter 10 is designed for use in an airbag inflator (not shown in FIG. 1). More specifically, the filter 10 is designed such that when placed in an airbag inflator, the filter 10 will filter the quantity of inflation gas that is produced upon ignition of a quantity of pyrotechnic material (not shown in FIG. 1). Such "filtering" of the gas operates to cool the gas and/or remove any particulate matter found in the gas prior to having the gas exit the inflator and enter a vehicle airbag (not shown).

In order to filter the inflation gas, the filter 10 may have a series of openings 12. The openings are generally small, and as such, the openings 12 are shown in the enlarged regions. These openings 12 allow the gas to flow through the filter 10. However, many solid particulates will be too large to pass through the filter, but instead will be trapped on the filter 10.

As shown in FIG. 1, the filter 10 is a single strip of material. However, as known in the art, inflators are often cylindrical in shape. As a result, the inflator will generally have a circular profile. Accordingly, the filter 10 is generally a "wrapped filter," meaning that it will be wrapped around the circular-profile of the inflator. The gas generant will be positioned interior of the filter 10. Such wrapping of the filter 10 may cause the filter 10 to form a variety of different layers. The gas escaping from the inflator must pass through all of the layers of the filter prior to escaping the filter 10.

In some embodiments, the filter 10 may have openings 12 that have different sizes (or diameters). For example, the openings 12a have a smaller diameter whereas the openings 12b will have a larger size (or diameter). In some embodiments, the openings 12a and 12b will be positioned such that these openings will be on different "layers" when the filter 10 is wrapped about the gas generant. Likewise, adjacent openings, or openings that are proximate on the filter 10 may have different sizes and profiles, as desired. Those skilled in the art would appreciate how this may be accomplished. Similarly, embodiments may be constructed in which the openings on the same layer may have different shapes and sizes, as desired. The exact way in which the size of the openings 12 may be varied is disclosed herein.

Figure 1A:
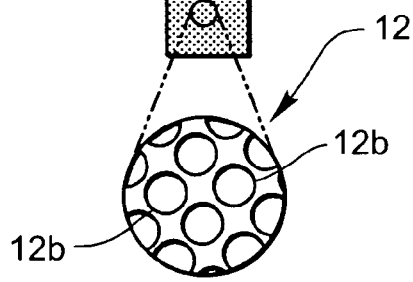
FIG. 1A is a cutaway layout plan view that shows how one embodiment of the filter may be constructed.

FIG. 1A is a plan view that shows how one embodiment of the filter 10 may be constructed. Specifically, the filter 10 may be made of metal or other similar material and may be an "expanded metal" filter. In an expanded metal filter, the filter is made of a material that is pierced or punctured to form a slit. Once, the slit is formed, the slit is "pulled," "stretched" or "expanded" so that the slit is sized to the appropriate and desired size. The size of the initial piercing as well as the degree to which the material is stretched determines the final size of the opening 12. In FIG. 1A, the arrow depicts the direction in which the filter 10 is "pulled" or stretched to form openings 12a, 12b.

Obviously using these techniques, openings 12 of various sizes may be obtained. For example, different rows 16 (FIG. 2) may be expanded to different sizes. Similarly, adjacent openings 12 may be sized as desired. In fact, any desired size may be used to any particular opening, group of openings, or section of openings, as desired. Other embodiments may be made in which the slits formed by initially piercing the metal are all the same size, and then the differences in the opening sizes are introduced by selectively expanding certain openings to a greater extent (and thus creating larger holes for the openings that were expanded more).

It should be noted that the use of different sizes of openings in a single strip of filter material may be beneficial. For example, by varying the size of the openings, the flow of the gas through the filter may be tuned, changed, adjusted, as desired. By changing the size of the holes, this may operate to restrict or reduce the rate that the pressure rises within the airbag. (This is in essence, "tuning" the gas flow). Further, restricting the gas output results in higher operating pressures within the inflator. Accordingly, the pressure of the inflator may be adjusted. Finally, by changing the gas flow, the onset of performance of the inflator changes, which, in some embodiments can o operate to cool (dissipate heat) from the gas, further changing the operation characteristics of the inflator.

Likewise, by varying the size of the openings throughout the filter, a non-uniform filter may be achieved, thus meaning that the flow of gas through one portion/section of the filter may differ than the flow of gas through another section of the filter. Such less constant and/or non-uniform flow may be desirable in that it may provide more effective filtering of the particulates out of the gas. Further, this non-uniform, less constant gas flow may operate to provide further cooling of the gas prior to the gas exiting the filter. Further, another advantage of using expanded metal filters may be lower cost. In some situations, expanded metal filters may be less expensive to manufacture than woven wire mesh, wound wire, ceramic paper, knitted mesh, or other types of filters. Further, by being able to vary the hole size in a single sheet rather than multiple sheets of different materials, the manufacturing process may be simplified, thereby resulting in lower labor and manufacturing costs.

Figure 2:
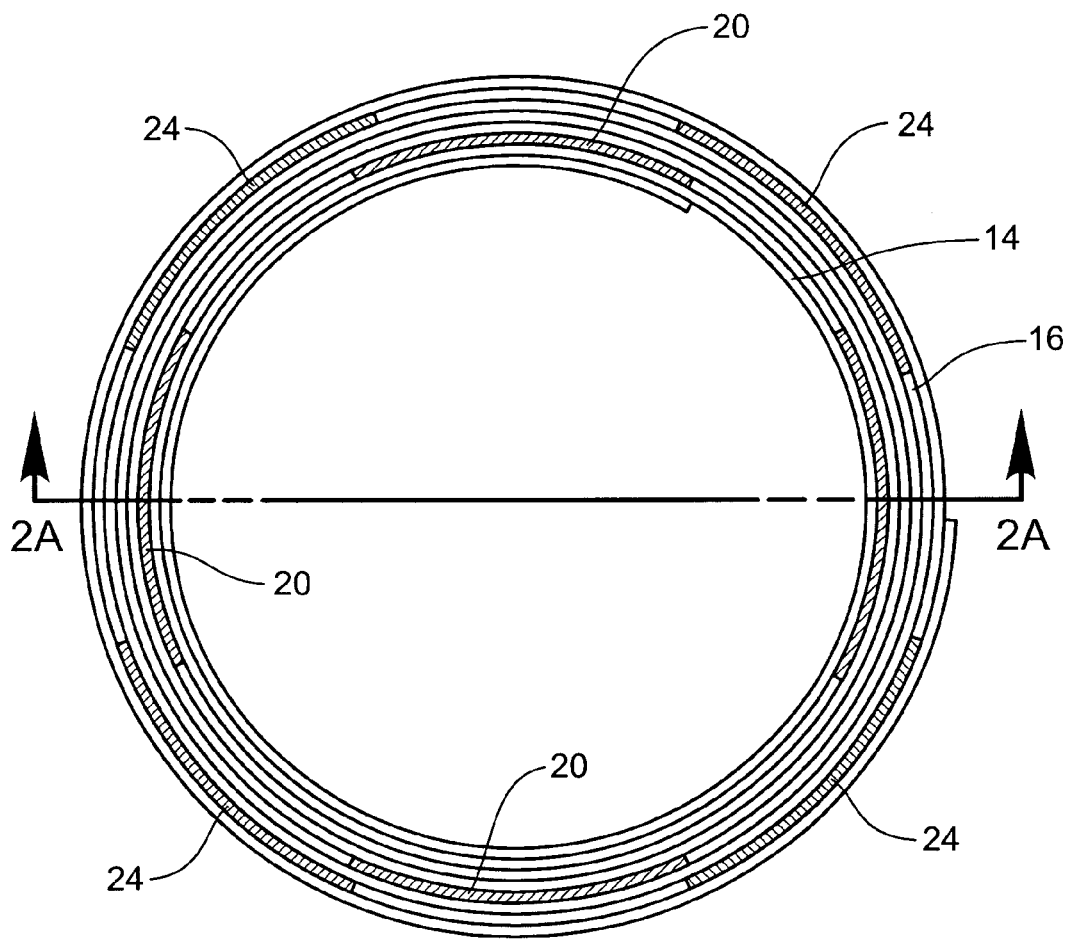
FIG. 2 is a sectional end view of a filter according to the present embodiments in the wrapped configuration.
Figure 2A:
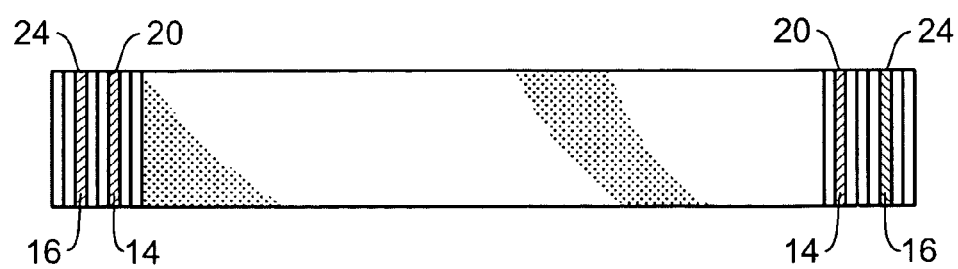
FIG. 2a is a sectional view along line 2A-2A of FIG. 2.

Referring now to FIG. 2, the filter 10 is shown in a wrapped configuration. As can be seen from FIG. 2, this filter 10 has a circular profile. When the filter 10 is in a wrapped configuration, the filter 10 forms a plurality (i.e., two or more) layers. The first layer is illustrated with reference number 14 and the second layer is illustrated with reference number 16. For purposes of this description, reference to the first layer 14 means that first layer 14 is disposed interior to second layer 16 and not necessarily literally mean that the first layer is the innermost layer and the second layer being the next layer adjacent the first layer. (The second layer may be any layer exterior of the first layer.) More than two layers may, of course, be formed, as desired. In fact, more layers are shown in FIG. 2. The first layer 14 or the second layer 16 may not necessarily be the initial or last layer, but may be any layer within the filter 10. As explained above, the first layer 14 will have an opening a different size than the second layer 16. For example, the openings 12a may be on the first layer 14 while the openings 12b may be on the second layer 16 (or vice versa). If the filter 10 comprises one or more additional layers, these additional layers may have openings of the same or a different size, as desired. FIG. 2A shows the filter 10 as a cross-sectional view for clarity.

In the embodiment shown in FIG. 2, a first set of barriers 20 and a second set of barriers 24 are shown with the first set of barriers being disposed inward of the second set of barriers 24. The barriers 20, 24 are areas of the filter 10 through which gas may not pass. In some embodiments, these barriers 20, 24 are simply metal plates that are added to the filter 10. In the embodiments in which the filter 10 is an expanded filter, the barriers 20, 24 may simply be portions of the metal filter that were not punctured and then expanded to form openings. (Because no such puncturing occurred, there areas are solid metal that do not allow gas to flow therethrough).

As shown in FIG. 2, the first set of barriers 20 and the second set of barriers 24 are found at different layers of the wrapped filter 10. Specifically, the second set of barriers 24 are positioned exterior of the first set of barriers 20. Thus, the gas flowing out of the filter 10 will flow through the layer housing the first set of barriers 20 prior to accessing the layer with the second set of barriers 24.

In the embodiment shown in FIG. 2, there are four (4) barriers that makeup the first set of barriers 20 that are spaced equally about the circular wrapped filter 10. Likewise, there are four (4) barriers that makeup the second set of barriers 24 that are spaced equally about the circular wrapped filter 10. This configuration may be modified, as desired. Specifically, the number of barriers or the placement of the barriers in either the first or second set of barriers 20, 24 may differ from that which is shown. The location and number of barriers 20, 24 may be determined to achieve a desired gas flow or cooling.

In the embodiment of FIG. 2, the second set of barriers 24 are offset from the first set of barriers 20. This means that the barriers that make up the second set of barriers 24 are not positioned directly behind the barriers in the first set of barriers 20. Rather, at least one of the barriers in the second set of barriers 24 will have a position that differs from the position of the corresponding barrier in the first set of barriers 20.

Figure 3:
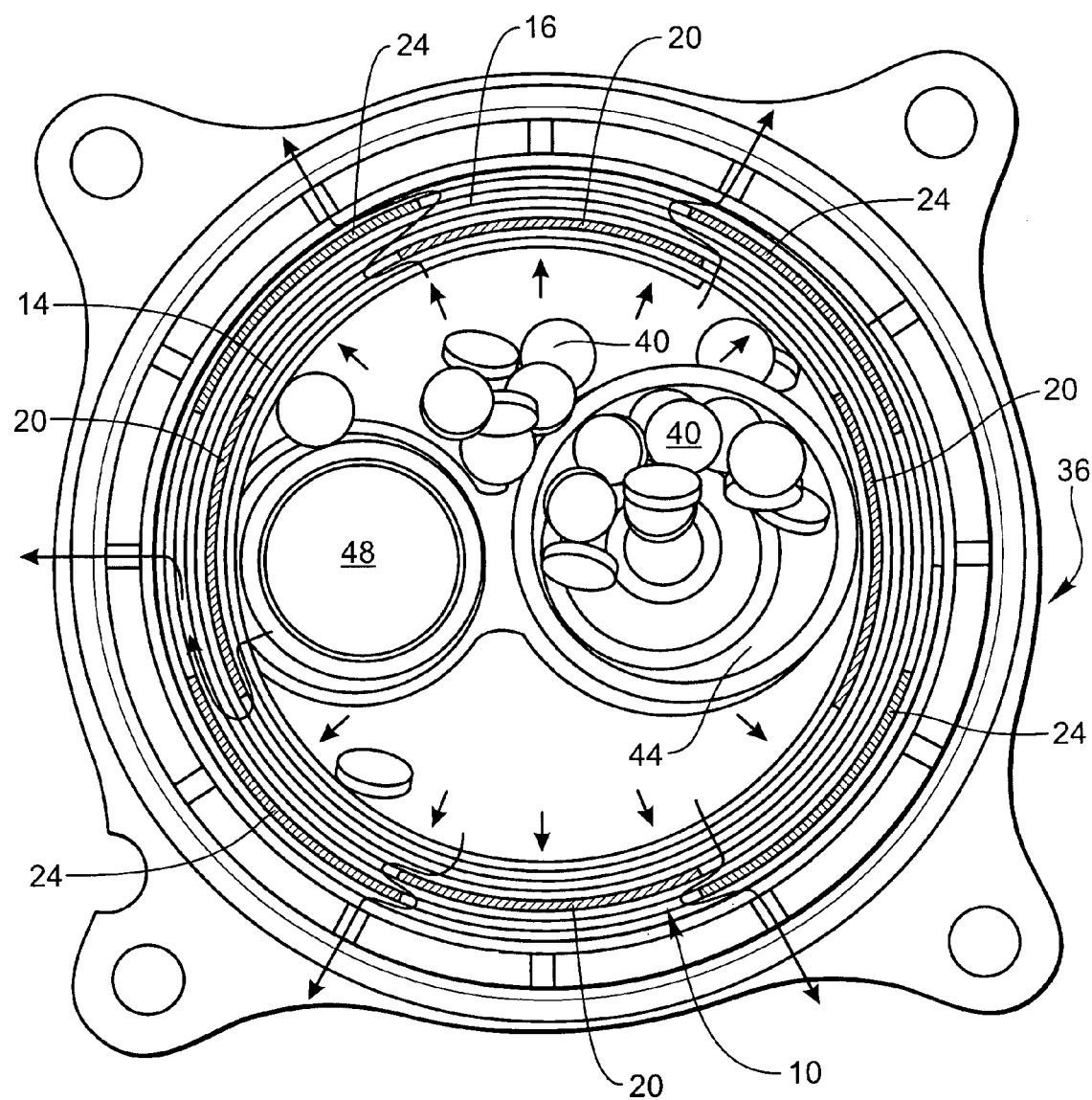
FIG. 3 is a cross-sectional view of an inflator that includes a filter of FIG. 2 disposed around gas generant.

Referring now to FIG. 3, the filter 10 is illustrated installed within an inflator 36. The inflator 36 is a pyrotechnic inflator and is thus capable of producing and/or channeling a large quantity of inflation gas into an airbag (not shown) during a vehicle crash. The inflator 36 includes a quantity of a pyrotechnic material 40. This pyrotechnic material 40 may also be referred to as a "gas generant." Any type of material capable of producing inflation gas upon ignition may be used as the pyrotechnic material 40. Those skilled in the art will appreciate that there are a variety of different materials that may be used. For purposes of clarity, the pyrotechnic material 40 is illustrated as pellets. However, other shapes and configurations of the pyrotechnic material are known and may be used.

In the embodiment shown in FIG. 3, some of the pyrotechnic material 40 is housed within a chamber 44, whereas another portion of the pyrotechnic material 40 may be positioned outside of the chamber 44. This depiction is not limiting. Any orientation or arrangement of the pyrotechnic material 40 within the inflator 36 may be used.

Likewise, the inflator 36 may include an initiator 48. The initiator 48 is designed to ignite the pyrotechnic material 40 during an accident or crash. More specifically, a signal is sent to the initiator 48 indicating crash conditions. Upon receipt of this signal, the initiator 48 operates to ignite the pyrotechnic material 40 and convert the pyrotechnic material 40 into the quantity of inflation gas that may be then used to inflate the airbag. It should be noted that, in the embodiment of FIG. 3, only one initiator 48 is illustrated. However, additional initiator(s) may be used (including an initiator that is within the chamber 44). Those skilled in the art will appreciate how to obtain/configure an initiator 48 such that it is capable of igniting the pyrotechnic material 40 during a crash.

The filter 10 is positioned to circumscribe the pyrotechnic material 40. Accordingly, when the pyrotechnic material 40 is ignited and converted into a quantity of inflation gas, this gas must pass through the filter 10 prior to exiting the inflator 36. The flow path of the gas exiting the inflator 36 is illustrated by the arrows shown in FIG. 3. Specifically, the gas, when passing through the filter 10, may contact/encounter the first set of barriers 20 and/or the second set of barriers 24. (This gas flow path is illustrated by the arrows in FIG. 3). As noted above, the first and second set of barriers 20, 24 are portions of the filter 10 that are solid and do not allow the gas to pass through. When the gas contacts/encounters a barrier in the first set of barriers 20 and/or the second set of barriers 24, the gas will be forced to turn or deflect in order to pass through the filter 10. Thus, gas exiting the inflator 36 must take a tortuous or twisting path. In other words, the gas flow is not "constant," as the gas is required to deflect and turn as advances through the filter 10 to exit. As the gases are turned, particulate matter, residue, solid particles, and/or other undesirable material collect on the barrier(s) and are removed from the gas flow. Accordingly, the barriers provide additional filtering of the gas that would not otherwise be possible. Likewise, when the gases contact the barriers and are re-directed, the gas will be cooled. Thus, the barriers may provide a cooling effect on the gas as well. Further, the barriers may also provide an additional advantage in that it may reduce "flaming" that is sometimes seen during deployment of pyrotechnic inflators. The specific openings 12 are not shown in FIGS. 2, 2A, and 3 so not to overly clutter the drawing. The path of the arrows passing from the layer to layer depicts where an opening is located to permit passage of the inflation gas therethrough.

In the embodiment shown in FIG. 3, all or substantially all of the gas, as it flows through the filter 10, will either contact the first set of barriers 20 or the second set of barriers 24. Accordingly, in this embodiment, all or substantially all of the gas will be required to undergo a tortuous path prior to exiting the filter 10. It should be noted that embodiments may be designed in which the gas passing through the filter 10 will contact the first set of barriers 20, be re-directed, contact the second set of barriers 24, be re-directed, and then flow out of the filter 10. Such a flow path increases the likelihood that the particulate matter, residue, etc. will be deposited on the barriers. If additional barriers are used, then the flow of gas may be further re-directed, turned, etc. as desired.

It should be noted that the filter 10 is a wrapped filter that comprises a plurality of layers. In some embodiments, the filter with the barriers may be a wire mesh filter with barrier plates (made of metal or other materials) added to serve as the required barriers. However, other embodiments are designed in which the filter 10 is an expanded metal filter. As explained above, the expanded metal filter is made of metal and is constructed by piercing the sheet of metal to form slits and then expanding the slits to form holes of the desired size. The gas may then flow through the holes in the metal. In such embodiments, the barriers may simply be areas of the metal that were un-pierced. Further embodiments may be designed in which the holes in the filter are of varying size, such that when the filter is wrapped forming a plurality of layers, wherein at least two of the layer have holes that are a different size. (Some of the potential advantages for using expanded metal filters with varying hole sizes are discussed above).

As is known in the industry, the flow of hot gas (such as the type formed by ignition of the pyrotechnic material 40) through the filter 10 is a dynamic event. Accordingly, trial and error testing may be used with the present embodiments to "tune" the hole sizes to provide optimal filtration, yet at the same time, not affect the internal pressure at which the inflator 36 is deployed. Further, the amount of the tuning may depend upon the size of the inflator, amount of the pyrotechnic material, etc. However, such trial and error is well known within the ordinary skill in the industry. Accordingly, those skilled in the art can clearly practice this invention.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. An inflator comprising:
a pyrotechnic material for producing a quantity of gas during deployment; and
an expanded metal filter wrapped about the pyrotechnic material, wherein when the filter is wrapped about the pyrotechnic material, the filter forms a plurality of layers, at least two layers have holes that are a different size, and the filter includes a plurality of barrier plates positioned to impede and redirect the flow of gas through the filter as wrapped.

2. An inflator as in claim 1 wherein the flow of the gas through different size holes ensures that the gas flow is not constant and operates to filter and cool the gas.

3. An inflator as in claim 1 wherein the holes of different sizes are produced by piercing the metal filter to form holes of consistent size and then expanding the holes into a slit having the desired size.

4. An inflator as in claim 1 wherein the filter is tuned such that it does not affect the internal combustion pressure of the inflator.

5. An inflator as in claim 1 wherein the filter is a single sheet of material.

6. An inflator as in claim 1 wherein at least one of the plurality of barrier plates is disposed substantially parallel to the axis of the filter as wrapped.

7. An inflator as in claim 1 wherein the plurality of barrier plates are arranged in a first barrier set and a second barrier set the second barrier set being positioned exterior of the first barrier set, the second barrier set being offset from the first barrier.

8. An inflator as in claim 7 wherein the gas passing through the filter will encounter a first barrier of the first barrier set, be re-directed, encounter a second barrier of the second barrier set, be re-directed, and then flow out of the filter.

9. An inflator as in claim 8 wherein the redirection of the gas by the first barrier causes particulates to collect on the first barrier set and the redirection of the gas by the second barrier causes particulates to collect on the second barrier set.

10. An inflator as in claim 7 wherein the first barrier set and second barrier set are areas of the expanded metal filter without holes.

11. An inflator comprising:
a pyrotechnic material for producing a quantity of gas during deployment: and
a filter wrapped about the pyrotechnic material, the filter comprising a plurality of layers, the filter further comprising a first set of barrier plates positioned to impede and redirect the flow of gas and a second set of barrier plates positioned to impede and redirect the flow of gas and positioned exterior of the first set of barrier plates, the second set of barrier plates being offset from the first set of barrier plates such that gas passing through the filter will encounter the first set of barrier plates, be re-directed, contact the second set of barrier plates, be re-directed, and then flow out of the filter.

12. An inflator as in claim 11 wherein the redirection of the gas by the first set of barrier plates causes particulates to collect on the first set of barrier plates and the redirection of the gas by the second set of barrier plates causes particulates to collect on the second set of barrier plates.

13. An inflator as in claim 11 wherein the filter comprises an expanded metal filter wrapped about the pyrotechnic material, wherein when the filter is wrapped about the pyrotechnic material, the filter forms a plurality of layers and at least two of the layers have holes that are a different size.

14. An inflator as in claim 13 wherein the flow of the gas through different size holes ensures that the gas flow is not constant and operates to filter and cool the gas.

15. An inflator as in claim 13 wherein the holes of different sizes are produced by piercing the metal filter to form holes of consistent size and then expanding the holes into a slit having the desired size.

16. An inflator as in claim 13 wherein adjacent holes have different sizes.

17. An inflator as in claim 13 wherein the holes are formed by having slits of different sizes and then expanding the slits.

18. An expanded metal filter for use in an airbag inflator comprising a plurality of layers for wrapping about a pyrotechnic material, wherein when the filter is wrapped about the pyrotechnic material, at least two layers have holes that are a different size, and the filter includes a plurality of barrier plates positioned to impede and redirect the flow of gas through the filter as wrapped.

19. A filter as in claim 18 wherein the barrier plates comprise a first set of barriers and a second set of barriers that are positioned exterior of the first set of barriers, the second set of barriers being offset from the first set of barriers, the gas passing through the filter will encounter the first set of barriers, be re-directed, contact the second set of barriers, be re-directed, and then flow out of the filter.

20. A filter as in claim 7 wherein the barrier plates of the first barrier set are spaced equally about the filter as wrapped.

21. A filter as in claim 20 wherein the barrier plates of the second barrier set are spaced equally about the wrapped filter, offset from the first barrier set such that the first and second set of barriers overlap.

22. A filter as in claim 7 wherein the barrier plates of the either the first barrier set or the second barrier set are spaced other than equally about the filter as wrapped.

* * * * *

UNITED STATES PATENT AND TRADEMARK OFFICE
CERTIFICATE OF CORRECTION

| | | |
|---|---|---|
| PATENT NO. | : 7,823,919 B2 | Page 1 of 1 |
| APPLICATION NO. | : 12/154750 | |
| DATED | : November 2, 2010 | |
| INVENTOR(S) | : Scott Jackson et al. | |

It is certified that error appears in the above-identified patent and that said Letters Patent is hereby corrected as shown below:

In column 7, claim 7, line 57, please replace "second barrier set the second barrier set" with --second barrier set, the second barrier set--

In column 8, claim 22, line 62, please replace "barrier plates of the either the" with --barrier plates of either the--

Signed and Sealed this
Fifteenth Day of February, 2011

David J. Kappos
*Director of the United States Patent and Trademark Office*